US005696059A

United States Patent [19]

Onan et al.

[11] Patent Number: 5,696,059
[45] Date of Patent: Dec. 9, 1997

[54] METHODS OF PREVENTING WELL CEMENT STRESS FAILURE

[75] Inventors: David D. Onan, Lawton; James E. Griffith, Duncan, both of Okla.; William W. Webster, Arlington, Tex.

[73] Assignee: Halliburton Company, Duncan, Okla.

[21] Appl. No.: 593,307

[22] Filed: Jan. 31, 1996

[51] Int. Cl.$^6$ ................................................ E21B 33/14
[52] U.S. Cl. ........................ 507/269; 507/202; 507/254; 507/261; 166/293
[58] Field of Search ............................ 507/203, 202, 507/253, 254, 262, 269, 261; 166/293

[56] References Cited

U.S. PATENT DOCUMENTS

| | | | |
|---|---|---|---|
| 4,234,344 | 11/1980 | Tinsley et al. | 106/672 |
| 4,871,395 | 10/1989 | Sugama | 106/188 |
| 5,121,795 | 6/1992 | Ewert et al. | 166/292 |
| 5,125,455 | 6/1992 | Harris et al. | 166/292 |
| 5,133,409 | 7/1992 | Bour et al. | 166/293 |
| 5,147,565 | 9/1992 | Bour et al. | 252/8.551 |
| 5,309,996 | 5/1994 | Sutton | 166/286 |
| 5,327,969 | 7/1994 | Sabins et al. | 166/250 |
| 5,339,903 | 8/1994 | Eoff et al. | 166/293 |
| 5,358,047 | 10/1994 | Himes et al. | 166/280 |
| 5,571,318 | 11/1996 | Griffith et al. | 106/725 |

FOREIGN PATENT DOCUMENTS

| | | |
|---|---|---|
| A-75721/94 | 4/1995 | Australia . |
| 0 030 408 | 6/1981 | European Pat. Off. . |
| 355902 | 9/1931 | United Kingdom . |

OTHER PUBLICATIONS

World Oil, vol. 198, No. 6. May 1984, Texas, USA, pp. 135–144, XP002024854 T. Smith et al: "Light, strong foamed cement: A new tool for problem wells".

*Primary Examiner*—Sharon Gibson
*Assistant Examiner*—Valerie Fee
*Attorney, Agent, or Firm*—Craig W. Roddy; C. Clark Dougherty, Jr.

[57] ABSTRACT

Improved methods of cementing in a well are provided whereby stress failures in the resulting set cement are prevented or reduced. The methods basically comprise the steps of placing a foamed cement composition in a zone in the well to be cemented which when set has sufficient elastic properties to resist stress failure comprised of hydraulic cement, water, a gas present in an amount in the range of from about 5% to about 75% by volume of the cement composition and a foaming agent, and then allowing the cement composition to set across the zone.

14 Claims, No Drawings

METHODS OF PREVENTING WELL CEMENT STRESS FAILURE

BACKGROUND OF THE INVENTION

1. Field of the Invention

The present invention relates to improved methods of cementing wells, and more particularly, but not by way of limitation, to methods of cementing wells whereby stress failures in the resulting set cement and cemented pipe are prevented or reduced.

2. Description of the Prior Art

In cementing operations carried out in oil and gas wells, a hydraulic cement composition is pumped by way of the well bore across a zone or formation to be cemented and allowed to set therein. In primary cementing, a hydraulic cement composition is pumped into the annulus between the walls of the well bore and the exterior of a pipe, e.g., casing, disposed therein. The cement composition is permitted to set in the annulus thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

In remedial cementing operations, a hydraulic cement composition is pumped through the well bore into a particular subterranean zone or formation into or from which it is desired to stop the flow of fluids. Upon setting, the cement composition prevents the undesirable fluids from flowing into or from the well bore or a pipe such as casing cemented therein.

Set cement in wells, and particularly the set cement forming the cement sheath in the annulus of high temperature wells, often fail due to shear and compressional stress exerted on the set cement. The term "high temperature well" as used herein means a well wherein fluids injected into the well or produced from the well by way of the well bore cause a temperature increase of at least about 100° F. over initial cement setting conditions. The stress referred to herein is defined as the force applied over an area resulting from a strain caused by the incremental change of a body's length or volume. The stress is generally related to strain by a proportionality constant known as Young's Modulus. Young's Modulus has a different value for each type of material. In well bore sealing, Young's Modulus for non-foamed cements is about $3 \times 10^6$ $lb_f$ per sq. inch. and for steel casing about $30 \times 10^6$ $lb_f$ per sq. inch.

There are several stress conditions associated with cement sheath failures. One such condition is the result of relatively high fluid pressures and/or temperatures inside of pipe cemented in the well bore during testing, perforating, pressure and/or temperature results in expansion of the pipe, both radially and longitudinally which places stresses on the cement sheath causing it to crack, or the bond between the outside surface of the pipe and the cement sheath to fail in the form of loss of hydraulic seal. Another condition results from exceedingly high pressures which occur inside the annular cement sheath due to the thermal expansion of fluids trapped within the cement sheath. This condition often occurs as a result of high temperature differentials created during production or injection of high temperature fluids through the well bore, e.g., wells subjected to steam recovery processes or the production of hot formation fluids through the well bores of high temperature wells. Typically, the pressure of the trapped fluids exceeds the collapse pressure of the cemented pipe causing leaks or failure. Yet another condition occurs as a result of outside forces exerted on the cement sheath due to formation shifting and overburdened pressures.

When such stresses are exerted on the set cement in the well bore, the set cement can fail in the form of radial or circumferential cracking of the cement as well as in the break down of the bonds between the cement and pipe or between the cement and the formation. The failure of the set cement (due to the loss of hydraulic seal of the annulus) can result in lost production, environmental pollution, hazardous rig operations and/or hazardous production operations. The most common hazard is the presence of pressure at the well head in the form trapped gas between casing strings.

Thus, there is a need for well cementing methods utilizing cement compositions which set into adequate strength masses (>100 psi compressive strength) having elastic properties whereby the set cement can withstand the above mentioned subterranean stresses.

SUMMARY OF THE INVENTION

The present invention provides improved methods of cementing wells which meet the needs described above and overcome the shortcomings of the prior art. The methods are basically comprised of the steps of placing a foamed cement composition comprised of hydraulic cement, water, a gas present in an amount in the general range of from about 5% to about 75% by volume of the composition and a foaming agent in a subterranean zone to be cemented and allowing the cement composition to set in the zone. In cementing applications in high temperature wells, the foamed cement composition most preferably contains gas in an amount in the range of from about 25% to about 45% by volume of the cement composition and also preferably contains finely ground silica.

After setting, the foamed cement composition containing a gas such as air or nitrogen within the quantitative ranges set forth above has elastic properties sufficient to resist stress failure as a result of formation and/or cemented pipe movement and the like.

It is, therefore, a general object of the present invention to provide improved methods of cementing in wells whereby well cement and cemented pipe stress failures are prevented or reduced.

Other and further objects, features and advantages of the present invention will be readily apparent to those skilled in the art upon a reading of the description of preferred embodiments which follows.

DESCRIPTION OF PREFERRED EMBODIMENTS

As mentioned above, the well cementing methods of this invention prevent or substantially reduce stress failures in subterranean set cement and in pipe cemented in well bores. Such failures often occur in set well cement and/or cemented pipe due to forces exerted on the cement by the movement and overburden pressures of formation materials, internal pressures created in the set cement as a result of expansion due to temperature changes, the movement of pipe cemented in a well bore due to expansion caused by high pressure and/or high temperature fluids flowing through the pipe and the like. Such failures of the set cement and/or cemented pipe are prevented in accordance with the methods of this invention by placing a well cement composition in the subterranean zone to be cemented which when set has sufficient elastic properties to resist and/or absorb the stresses exerted on it.

The cement compositions utilized in accordance with this invention must be substantially impermeable and provide sufficient compressive strength to seal zones and formations containing fluids under pressure and support pipe such as casing in the well bore. Further, the cement compositions must readily bond to formation surfaces, and in primary cementing, to the exterior surfaces of pipe. In addition, and most importantly, the set cement compositions must be deformable and have overall elastic properties sufficient to resist and/or absorb stresses of the types described above.

The cement compositions utilized in accordance with this invention which meet the above stated needs and requirements are comprised of hydraulic cement, water, a gas and a foaming agent, the gas being present in an amount in the range of from about 5% to about 75% by volume of the composition. In cementing applications in high temperature wells, the foamed cement compositions preferably contain gas in an amount in the range of from about 25% to about 45% by volume of the compositions and also include particulate silica. When set, the foamed cement compositions have sufficient elastic properties to deform under applied stresses exerted on them in subterranean well locations whereby cracking, formation and pipe bond failure, cemented pipe failure and the like do not take place. The methods of the invention basically comprise the steps of placing a foamed cement composition of the type described above in a zone in a well to be cemented and allowing the cement composition to set in the zone.

A variety of hydraulic cementitious materials which form hard cementitious masses in the presence of water can be utilized in accordance with this invention. Examples of such cementitious materials are Portland cement, high alumina cement, slag and/or fly ash (ASTM Class F fly ash) and lime, fly ash which includes free lime (ASTM Class C fly ash), condensed silica fume with lime, gypsum cement (calcium sulfate hemihydrate) and mixtures of such materials.

Of the various hydraulic cements which can be utilized, the most preferred are Portland or equivalent cements, e.g., Portland cements of the types defined and described in *API Specification for Materials and Testing for Well Cements*, API Specification 10, 5th Edition, dated Jul. 1, 1990 of the American Petroleum Institute. Examples of API Portland cements which are particularly suitable are Class A, B, C, G or H. These API Portland cements and equivalent cements are relatively course, i.e., they have a maximum particle size of about 90 microns and a specific surface (sometimes referred to as Blaine Fineness) of about 3,900 square centimeters per gram.

Fine particle size Portland or equivalent cements which generally consist of particles having diameters no larger than about 30 microns and having a Blaine Fineness no less than about 6,000 square centimeters per gram are also preferred for use in accordance with the present invention. Fine particle size hydraulic cements and their use in well completion and remedial operations are disclosed in U.S. Pat. Nos. 5,121,795 issued Jun. 16, 1992 to Ewert et al. and 5,125,455 issued Jun. 30, 1992 to Harris et al., both of which are incorporated herein by reference.

In many applications, it is advantageous to use a mixture of relatively course Portland or the equivalent cement and a fine particle size Portland or the equivalent cement to bring about short cement composition transition time and rapid development of compressive strength. When included, the fine particle size cement is present in an amount in the range of from about 5% to about 35% by weight of the relatively course cement in the composition.

As mentioned, in high temperature applications, the cement compositions preferably include particulate silica in an amount in the range of from about 25% to about 45% by weight of hydraulic cement in the compositions to prevent compressive strength retrogression. The particulate silica can be a fine particle size ground silica such as silica flour which has a particle size no greater than about 50 microns and is preferred for use in accordance with this invention, or it can be a relatively course silica sand such as 200 mesh silica sand which has a particle size no greater than about 300 microns.

The water used in the cement compositions useful in accordance with this invention can be water from any source provided it does not contain an excess of compounds which adversely react with or otherwise affect other components in the cement compositions. For example, the water can be fresh water, salt water, brines, seawater, and/or aqueous drilling mud. Generally, the water is present in the compositions in an amount in the range of from about 30% to about 100% by weight of the hydraulic cement in the compositions.

The gas used to form the cement compositions of this invention is preferably nitrogen or air, with nitrogen being the most preferred. The gas must be present in an amount sufficient to provide the necessary deformation and elasticity properties to the set cement whereby it deforms under stresses. Generally, it has been found that the amount of gas in the foamed cement composition must be an amount in the range of from about 5% to about 75% by volume of the resulting foamed cement composition. More preferably, the gas is present in an amount in the range of from about 20% to about 40% by volume of the cement composition. As stated above, in applications in high temperature wells, the cement compositions preferably contain gas in an amount in the range of from about 25% to about 45% by volume of the cement composition.

In order to facilitate foaming and to stabilize the foamed slurry, a foaming agent is preferably included in the cement composition. Suitable foaming agents are surfactants having the general formula:

wherein:

a is an integer in the range of from about 5 to about 15;

b is an integer in the range of from about 1 to about 10; and

X is any compatible cation.

A particularly preferred foaming agent is a surfactant of the above type having the formula:

wherein:

a is an integer in the range of from about 6 to about 10. This surfactant is commercially available from Halliburton Energy Services of Duncan, Okla., under the trade designation "CFA-S™."

Another particularly preferred foaming agent of the above mentioned type is a surfactant having the formula:

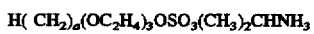

wherein:

a is an integer in the range of from about 6 to about 10.

This surfactant is available from the Witco Chemical Company under the trade name "WITCOLATE 1259™."

Other foaming agents which can be utilized in the cement compositions of this invention include sulfated alkoxylated alcohols such as a sulfated linear $C_{12}$ to $C_{14}$ alcohol ethoxylated with three moles of ethylene oxide, betaines, sulfated or sulfonated alkoxylates, alkyl quaternary amines, alkyl sulfonates, alkyl aryl sulfonates, $C_{10}$–$C_{20}$ alkyl diphenyl ether sulfonates and the like. The particular surfactant employed will depend on various factors such as the types of formations in which the foamed cement is to be placed, etc.

The foaming agent utilized is included in a cement composition of this invention in an amount in the range of from about 0.5% to about 10% by weight of water in the composition. When the foaming agent is one of the particularly preferred surfactants described above, it is preferably included in the composition in an amount in the range of from about 2% to about 4% by weight of water therein.

A foam stabilizer can also be included in the foamed cement compositions of this invention to enhance the stability of the foamed cement slurry. When the temperature to which the cement composition will be subjected is below about 130° F., the foam stabilizer is preferably a compound of the formula:

$$CH_3O(CH_2CHO)_n\text{—}R$$
$$|$$
$$R$$

wherein:

R is hydrogen or a methyl radical; and n is an integer in the range of from about 20 to about 200.

A particularly preferred foam stabilizer of the above type is a methoxypolyethylene glycol of the formula:

$$CH_3O(CH_2CH_2O)_nH$$

wherein:

n is in the range of from about 100 to about 150.

This from foam stabilizer is commercially available Halliburton Energy Services under the trade designation "HALLIBURTON FOAM STABILIZER™."

When the temperature to which the cement composition will be subjected is above about 130° F., the foam stabilizer is preferably a compound having the formula:

$$R\text{—}CONHCH_2CH_2CH_2N^+(CH_3)_2CH_2CO_2^-$$

wherein:

R is decyl, cetyl, oleyl, lauryl or coco.

A particularly preferred foam stabilizer of the above type is an amidopropylbetaine of the formula:

$$R\text{—}CONHCH_2CH_2CH_2N^+(CH_3)_2CH_2CO_2^-$$

wherein:

R is a coco radical.

This foam stabilizer is commercially available from Halliburton Energy Services under the trade name "HC-2™."

When a foam stabilizer is utilized, it is included in a cement composition of this invention in an amount in the range of from about 0.1% to about 10% by weight of water utilized. When the foam stabilizing agent is one of the particularly preferred agents described above, it is preferably present in the composition in an amount in the range of from about 0.5% to about 2% by weight of water.

A particularly preferred foamed cement composition for use in performing the methods of this invention which when set has sufficient elastic properties to resist or absorb stresses of the type described above is comprised of a hydraulic cement; water present in an amount sufficient to form a pumpable slurry, e.g., an amount in the range of from about 30% to about 60% by weight of cement in the composition; nitrogen or air present in an amount in the range of from about 25% to about 35% by volume of the cement composition; a foaming agent selected from the group consisting of surfactants of the formula:

$$H(CH_2)_a(OC_2H_4)_bOSO_3X$$

wherein:

a is an integer in the range of from about 5 to about 15, b is an integer in the range of from about 1 to about 10, and X is any compatible cation, the foaming agent being present in an amount in the range of from about 2% to about 4% by weight of water in the composition; and a foam stabilizer selected from the group consisting of a methoxypolyethylene glycol having the formula:

$$CH_3O(CH_2CH_2O)_nH$$

wherein:

n is an integer in the range of from about 100 to about 150, and an amidopropylbetaine of the formula:

$$R\text{—}CONHCH_2CH_2CH_2N^+(CH_3)_2CH_2CO_2^-$$

wherein:

R is coco, the foam stabilizer being present in an amount in the range of from about 0.5% to about 1% by weight of water in the composition.

As mentioned, the hydraulic cement in the above described foamed cement composition is preferably Portland or the equivalent cement. More preferably, and particularly when the cement composition is used in a high temperature well, the hydraulic cement is a mixture of relatively course API Portland or the equivalent cement and a fine particle size Portland or the equivalent cement, the fine particle size cement being present in an amount of about 18% by weight of the relatively course cement in the composition.

As also mentioned, when the well being cemented is a high temperature well, silica flour is preferably also present in the cement composition in an amount of about 35% by weight of the hydraulic cement therein to prevent set cement compressive strength retrogression.

As will be understood by those skilled in the art, the cement compositions of this invention can include a variety of known additives for achieving desired properties and results such as set retarding additives, fluid loss control additives, free water control agents and the like.

In forming the cement compositions of this invention, the hydraulic cement, and any other dry additives used are preferably first blended together followed by mixing with the water used to form a pumpable slurry. As the slurry is pumped to the well bore, the foaming agent and foam stabilizer (if used) followed by the nitrogen or air are preferably injected into the slurry on the fly. As the slurry and gas flow to the cement composition placement location in the well, the cement composition is foamed and stabilized.

The methods of this invention for cementing in a well basically comprise the steps of placing a foamed cement composition of the type described herein which when set has sufficient elastic properties to deform under applied stresses in a subterranean zone to be cemented, and maintaining the cement composition across the zone for a time sufficient for the cement composition to set therein.

In order to further illustrate the compositions and methods of this invention, the following examples are given.

EXAMPLE 1

Tests to determine the effects of external heating on the pressure developed and exerted in a cemented annulus when a water or mud pocket exists therein were conducted. A heated test cell simulating the closed annulus of a well was utilized for carrying out the tests. When the test cell was filled with water, closed and heated to 300° F., the pressure in the cell rose to 15,000 to 16,000 psi. When the cell was filled with set cement and closed, the pressure did not rise during heating to 300° F. When the closed cell was about 40% filled with set neat Class H cement and 60% with drilling fluid or water, the pressure rose to a level in the range from about 9,000 to about 15,000 psi. Thus, the pressure generated within a closed annulus containing set cement having free water or drilling fluid pockets therein can cause the failure of the casing or pipe cemented in the well.

Additional tests were conducted with the test cell utilizing the foamed cement compositions of the present invention. The foamed cement compositions tested were placed in the test cell in a quantity which filled the test cell to 40% of its volume and allowed to set therein for 7 days at room temperature. After the cement composition set, the remainder of the cell was filled with fresh water or drilling fluid. Thereafter, the test cell was closed and heated from room temperature to 300° F. while the pressure exerted within the cell was monitored. The results of these tests are set forth in Table I below.

TABLE I

| Cement Composition Tested | Density, lb/gal | Foam Quality, % gas by volume of foamed cement composition | Pressure, psi |
|---|---|---|---|
| A[1] | 9.9 | 38 | 0[6] |
| | 10.9 | 31 | 0[6] |
| | 11.6 | 27 | 100[6] |
| | 13.2 | 17 | 100[6]; 400[7] |
| | 14.5 | 9 | 5,500[6]; 15,400[7] |
| B[2] | 9.7 | 34 | 0[6] |
| | 10.9 | 26 | 0[6] |
| | 11.8 | 20 | 0[6]; 700[7] |
| | 13.1 | 11 | 2,400[6]; 12,000[7] |
| | 13.8 | 6 | 10,500[6] |
| C[3] | 13.6 | 28 | 0[6] |
| | 14.9 | 21 | 0[6] |
| | 15.7 | 17 | 0[6]; 0[7] |
| | 16.6 | 13 | 300[6]; 4,700[7] |
| D[4] | 6.0 | 63 | 7,400[6] |
| | 8.5 | 48 | 14,300[6] |
| | 11.0 | 32 | 100[6] |
| | 15.0 | 7 | 8,900[6] |
| | 15.4 | 5 | 6,900[6] |

TABLE I-continued

| Cement Composition Tested | Density, lb/gal | Foam Quality, % gas by volume of foamed cement composition | Pressure, psi |
|---|---|---|---|
| E[5] | 6.5 | 57 | 4,700[6] |
| | 8.0 | 47 | 8,500[6] |
| | 10.5 | 30 | 0[6] |
| | 11.0 | 27 | 0[6] |
| | 12.0 | 20 | 1,400[6] |

[1]Unfoamed base cement composition A was comprised of API Class H Portland cement and 35% silica flour by wt. of cement mixed with fresh water to a density of 15.9 lb/gal.
[2]Unfoamed base cement composition B was comprised of API Class H Portland cement; 18% fine particle size Portland cement by weight of the Class H cement and 35% silica flour by weight of the Class H and fine particle size cements mixed with fresh water to a density of 14.7 lb/gal.
[3]Unfoamed base cement composition C was comprised of API Class H Portland cement, 35% silica flour by weight of cement and 66% hemitite by weight of cement mixed with fresh water to a density of 19 lb/gal.
[4]Unfoamed base cement composition D was comprised of API Class H Portland cement mixed with fresh water to a density of 16.2 lb/gal.
[5]Unfoamed base cement composition E was comprised of API Class H Portland cement and 18% fine particle size Portland cement by weight of the Class H cement mixed with fresh water to a density of 15 lb/gal.
[6]Test cell contained set foamed cement and fresh water.
[7]Test cell contained set foamed cement and drilling fluid.

From Table I it can be seen that the set foamed cement compositions tested prevented high pressures, i.e., a pressure above 1,000 psi, from being produced in the presence of 60% by volume water or drilling fluid when the foam quality of the cement tested was between about 25% and 38%.

EXAMPLE 2

A foam cement composition of this invention was utilized to cement a liner in a deep high temperature well. The liner, i.e., a long string of pipe, was set at 18,150 feet with the top of the liner at 8,200 feet. The foamed cement composition was placed in the annulus between the liner and the walls of the well bore from the top of the liner to below the liner.

The cement composition used was comprised of a relatively coarse hydraulic cement equivalent to API Class H Portland cement, a fine particle size Portland cement in an amount of about 18% by weight of the relatively coarse cement, silica flour in an amount of about 35% by weight of the relatively coarse cement and the fine particle size cement, fresh water in an amount of about 8.78 gallons per sack of cement whereby the unfoamed cement slurry had a density of about 15 pounds per gallon, the foaming agent identified above as "CFA-S™" in an amount of about 3% by volume of fresh water, the foam stabilizer identified above as "HC-2™" in an amount of about 0.75% by volume of fresh water and nitrogen gas in the amount required to foam the cement slurry to a foam quality of from about 30% to about 35% by volume of the foamed cement composition.

The unfoamed slurry had the following properties: pump time—6 hrs:14 mins following a 80° F. to 260° F. temperature ramp while the pressure increased from 1,000 psi to 11,200 psi over the same period that the temperature was ramped; and the following rheology at 140° F.: yield point of 114 lbf/100 ft.$^2$ and a plastic viscosity of 92 cp. The set foamed slurry compressive strength was as follows: at 290° F. for 12 hours—106 psi; at 290° F. for 24 hours—607 psi; at 190° F. for 12 hours—714 psi; and at 190° F. for 24 hours—1,687 psi.

The cementing job was successfully completed and no evidence of set cement or other failure was noted during the first 6 months of operation of the completed well in spite of the fact that the temperature of formation fluids produced through the cemented liner was 100° F. and higher.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. An improved method of cementing in a well whereby stress failures in the resulting set cement are prevented or reduced comprising the steps of:

placing a foamed cement composition in a zone in said well to be cemented which when set has sufficient elastic properties to resist stress failure comprised of
a mixture of a relatively coarse Portland or the equivalent cement having a maximum particle size of about 90 microns and a fine particle size Portland or the equivalent cement having a maximum particle size of about 30 microns, the fine particle size cement being present in an amount in the range of from about 5% to about 35% by weight of the relatively coarse cement in said cement composition,
water,
a gas selected from nitrogen and air, and
a foaming agent selected from surfactants having the general formula

wherein
a is an integer in the range of from about 5 to about 15
b is an integer in the range of from about 1 to about 10 and
X is any compatible cation,
sulfated alkoxylated alcohols, betaines, sulfated or sulfonated alkoxylates, alkyl quaternary amines, alkyl sulfonates, alkyl aryl sulfonates and $C_{10}$–$C_{20}$ alkyl diphenyl ether sulfonates,
said gas being present in an amount in the range of from about 5% to about 75% by volume of said composition; and
allowing said cement composition to set in said zone.

2. The method of claim 1 wherein said water is selected from the group consisting of fresh water, salt water, brines, seawater, aqueous drilling mud and mixtures of such materials and is present in said cement composition in an amount in the range of from about 30% to about 100% by weight of hydraulic cement therein.

3. The method of claim 1 wherein said foaming agent is selected from the group consisting of a surfactant having the formula:

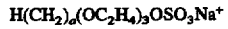

wherein:
a is an integer in the range of from about 6 to about 10 and a surfactant having the formula:

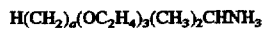

wherein:
a is an integer in the range of from about 6 to about 10, and is present in an amount in the range of from about 0.5% to about 10% by weight of water in said cement composition.

4. The method of claim 1, wherein said cement composition further comprises a foam stabilizer.

5. The method of claim 4 wherein said foam stabilizer is selected from the group consisting of a methoxypolyethylene glycol of the formula:

wherein:
n is in the range of from about 100 to 150 and an amidopropylbetaine of the formula:

wherein:
R is a coco radical,
and is present in an amount in the range of from about 0.1% to about 10% by weight of water in said cement composition.

6. The method of claim 1 wherein said cement composition further comprises particulate silica present in said cement composition in an amount in the range of from about 25% to about 45% by weight of cement therein.

7. An improved method of cementing a pipe in a well bore whereby stress failures in the resulting set cement are prevented or reduced comprising the steps of:

pumping a foamed cement composition into the annulus between said pipe in said well bore and the walls of said well bore which when set has sufficient elastic properties to resist stress failure comprised of
a mixture of a relatively coarse Portland or the equivalent cement having a maximum particle size of about 90 microns and a fine particle size Portland or the equivalent cement having a maximum particle size of about 30 microns, the fine particle size cement being present in an amount in the range of from about 5% to about 35% by weight of the relatively coarse cement in said cement composition,
water,
a gas selected from nitrogen and air,
a foaming agent selected from surfactants having the general formula

wherein
a is an integer in the range of from about 5 to about 15
b is an integer in the range of from about 1 to about 10 and
X is any compatible cation.
sulfated alkoxylated alcohols, betaines, sulfated or sulfonated alkoxylates, alkyl quaternary amines, alkyl sulfonates, alkyl aryl sulfonates and $C_{10}$–$C_{20}$ alkyl diphenyl ether sulfonates, and
a foam stabilizer selected from methoxypolyethylene glycols of the formula

wherein
n is in the range of from about 100 to 150 and an amidopropylbetaine of the formula

wherein

R is a coco radical, and particulate silica present in an amount in the range of from about 25% to about 45% by weight of cement in said composition, said gas being present in an amount in the range of from about 20% to about 40% by volume of said composition; and allowing said cement composition to set in said annulus.

8. The method of claim 7 wherein said water is selected from the group consisting of fresh water, salt water, brines and seawater in the range of from about 30% to about 100% by weight of Portland cement therein.

9. The method of claim 8 wherein said gas is nitrogen.

10. The method of claim 9 wherein said foaming agent is a surfactant having the formula

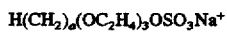

wherein a is an integer in the range of from about 6 to about 10 and is present in an amount in the range of from about 2% to about 4% by weight of water in said composition.

11. The method of claim 10 wherein said foam stabilizer is an amidopropylbetaine of the formula

wherein

R is a coco radical and is present in an amount in the range of from about 0.5% to about 1% by weight of water in said composition.

12. In a method of cementing a pipe in a well bore whereby a cement composition is placed in the annulus between the pipe and the walls of the well bore and then allowed to set therein, the improvement comprising:

utilizing a foamed cement composition which when set has sufficient elastic properties to resist stress failure comprised of a mixture of a relatively coarse Portland or the equivalent cement having a maximum particle size of about 90 microns and a fine particle size Portland or the equivalent cement having a maximum particle size of about 30 microns, the fine particle size cement being present in an amount of about 18% by weight of the relatively coarse cement in said composition, water present in an amount in the range of from about 30% to about 60% by weight of cement in said composition, nitrogen present in an amount of from about 25% to about 45% by volume of said composition, a foaming agent having the general formula

wherein a is an integer in the range of from about 6 to about 10 present in an amount in the range of from about 2% to about 4% by weight of water in said composition, a foam stabilizer comprising an amidopropylbetaine of the formula

wherein

R is a coco radical present in an amount in the range of from about 0.5% to about 1% by weight of water in said composition, and particulate silica present in an amount in the range of from about 25% to about 45% by weight of cement in said composition; and allowing said cement composition to set in said annulus.

13. The method of claim 12 wherein said water is selected from the group consisting of fresh water, salt water, brines and seawater.

14. The method of claim 13 wherein said relatively coarse Portland or equivalent cement is API Portland cement and said fine particle size Portland or equivalent cement is fine particle size Portland cement.

* * * * *

UNITED STATES PATENT AND TRADEMARK OFFICE
CERTIFICATE OF CORRECTION

PATENT NO. : 5,696,059
DATED : December 9, 1997
INVENTOR(S) : David D. Onan, et al.

It is certified that error appears in the above-identified patent and that said Letters Patent is hereby corrected as shown below:

On the title page, item [73] Assignee, after Duncan, Okla., insert --Mobil Oil Company, Fairfax, VA. --.

Signed and Sealed this

Eleventh Day of August 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,696,059
DATED : December 9, 1997
INVENTOR(S) : David D. Onan et al.

It is certified that error appears in the above-indentified patent and that said Letters Patent is hereby corrected as shown below: On the title page:

Item [73], the Assignee should be corrected as follows:

Assignee: Halliburton Company, Duncan, Okla. and Mobil Oil Corporation, New York.

This certificate supersedes Certificate of Correction issued August 11, 1998.

Signed and Sealed this

Twenty-sixth Day of January, 1999

Attest:

*Attesting Officer*   *Acting Commissioner of Patents and Trademarks*